United States Patent [19]

Wang

[11] Patent Number: 5,297,953
[45] Date of Patent: Mar. 29, 1994

[54] TOGGLED INJECTION MOLDING MACHINE HAVING A LUBRICATING SYSTEM

[75] Inventor: Po-Li Wang, Tainan City, Taiwan

[73] Assignee: Fu Chun Shin Machinery Manufacture Co., Ltd., Bay-Tow Village, Taiwan

[21] Appl. No.: 994,999

[22] Filed: Dec. 22, 1992

[51] Int. Cl.$^5$ ............................................. B29C 45/66
[52] U.S. Cl. ................................. 425/593; 425/451.6
[58] Field of Search ............ 425/589, 592, 593, 450.1, 425/451.5, 451.6

[56] References Cited

U.S. PATENT DOCUMENTS

| | | | |
|---|---|---|---|
| 4,773,845 | 9/1988 | Nagura et al. | 425/593 |
| 4,907,960 | 3/1990 | Hertzer | 425/593 |
| 5,052,908 | 10/1991 | Inaba et al. | 425/593 |

Primary Examiner—Tim Heitbrink

[57] ABSTRACT

A lubricating system is installed in a common injection molding machine which includes a stationary mold half unit, a movable mold half unit which can be moved towards and away from the stationary mold half unit, a toggle mechanism coupled with the movable mold half unit so as to be driven to move the movable mold half unit, a mold pressing hydraulic cylinder having a piston rod coupled with the toggle mechanism so as to drive the toggle mechanism, and an oil feed system coupled with the mold pressing hydraulic cylinder so as to provide hydraulic pressure for the mold pressing hydraulic cylinder to drive the toggle mechanism. The lubricating system includes a pump driving hydraulic cylinder coupled with the oil feed system so that the pump driving hydraulic cylinder can be operated synchronously with the mold pressing hydraulic cylinder, an oil tank for storing lubricating oil, and a lubricating oil pump coupled with the oil tank, the toggle mechanism and the piston rod of the pump driving hydraulic cylinder so that the oil pump is activated by the piston rod of the pump driving hydraulic cylinder so as to receive lubricating oil from the oil tank and then force the lubricating oil from the oil pump to the toggle mechanism in order to lubricate the latter.

2 Claims, 4 Drawing Sheets

TOGGLED INJECTION MOLDING MACHINE HAVING A LUBRICATING SYSTEM

BACKGROUND OF THE INVENTION

1. Field Of The invention

This invention relates to a lubricating system for an injection molding machine, more particularly to a lubricating system which is efficient and relatively inexpensive.

2. Description Of The Related Art Referring to FIG. 1, a common injection molding machine includes an elongated main body (A) which is adapted to be provided with a motor (not shown), an oil tank (not shown), an oil system (not shown), and a control circuit system (not shown), etc. therein. A material feeding system (B) is mounted on one end portion of the main body (A), and a mold pressing system (C) is mounted on the other end portion of the main body (A) and accepts material from the material feeding system (B) for molding. Referring to FIG. 2, the mold pressing system (C) includes a stationary mold half unit (C1), a stationary wall (C2), four horizontal longer connecting rods (C3), a movable mold half unit (C4), two connecting plates (C5), a toggle mechanism (C6), a mold pressing hydraulic cylinder (C7), a connecting cross member (C8) and two shorter connecting rods (C9). The stationary mold half unit (C1) and the stationary wall (C2) are adapted to be fixed on the main body (A) of the molding machine and are spaced apart and are aligned with each other. Each of the longer connecting rods (C3) is connected securely and perpendicularly to one corner of the stationary mold half unit (C1) at one end and is connected securely to one corner of the stationary wall (C2) at the other end. The movable mold half unit (C4) is mounted movably on the connecting rods (C3) so as to be moved toward and away from the stationary mold half unit (C1) along the connecting rods (C3). The two connecting plates (C5) are disposed between the stationary wall (C2) and the movable mold half unit (C4). One of the connecting plates (C5) interconnects the upper two connecting rods (C3), while the other one of the connecting plates (C5) interconnects the lower two connecting rods (C3). The toggle mechanism (C6) is coupled with the stationary wall (C2) and the movable mold half unit (C4). The mold pressing hydraulic cylinder (C7) has a horizontal cylinder body which is connected to the stationary wall (C2) in such a manner that the outer end of the piston rod (C71) of the hydraulic cylinder (C7) can be activated hydraulically so as to move between the stationary wall (C2) and the connecting members (C5). One of the shorter connecting rods (C9) is disposed between the upper two connecting rods (C3) and interconnects the stationary wall (C2) and the upper one of the connecting plates (C5). The other one of the shorter connecting rods (C9) is disposed between the lower two connecting rods (C3) and interconnects the stationary wall (C2) and the lower one of the connecting plates (C5). The cross member (C8) is mounted movably on the connecting rods (C9) at the two vertical distal ends thereof and is coupled with the outer end of the piston rod (C71) at the center and with the toggle mechanism (C6) at the two horizontal distal ends thereof so as to be driven to activate the toggle mechanism (C6) in order to move the movable mold half unit (C4). Referring to FIG. 3, another type of mold pressing system (D) includes a stationary mold half unit (D1); a stationary wall (D2) which is aligned with the stationary mold half unit (D1) and which is spaced apart from the same; a number of connecting rods (D3), each of which is coupled with the stationary mold half unit (D1) at one end and with the stationary wall (D2) at the other end; a movable mold half unit (D4) mounted movably on the connecting rods (D3) so as to be moved toward and away from the stationary mold half unit (D1) along the connecting rods (D3); a toggle mechanism (D5) coupled with the movable mold half unit (D4) and the stationary wall (D2); and a mold pressing hydraulic cylinder (D6) having a cylinder body connected securely to the stationary wall (D2) and a piston rod coupled with the toggle mechanism (D5) in such a manner that the piston rod of the mold pressing hydraulic cylinder (D6) can be activated hydraulically to drive the toggle mechanism (D5) so as to move the movable mold half unit (D4).

Each of the toggle mechanisms (C6,D5) includes a plurality of members which are connected pivotally to each other by means of pivots (5,5'). When the piston rods (C71,D61) of the mold pressing hydraulic cylinders (C7,D6) are activated to drive the toggle mechanisms (C6,D5) so as to move the movable mold half unit (C4,D4) to press against the stationary mold half unit (C1,D1), the contact areas between the pivots (5,5') and the members suffer from a great action force, such as shearing and frictional force, due to the great pressure between the movable mold half unit (C4,D4) and the stationary mold half unit (C1,D1), thereby easily wearing the pivots (5,5'). If the pivots (5,5') are worn, the normal operation of the mold pressing system (C,D) will be affected. Furthermore, an inferior product will be produced. Therefore, most of the injection molding machines have a lubricating system provided thereon for lubricating the contact areas between the members and the pivots (5,5') of the toggle mechanism (C6,D5).

One kind of a lubricating system for lubricating the contact areas between the members and the pivots of the toggle mechanism includes a drip cup which has lubricating oil stored therein. The drip cup and the contact areas are joined together by oil passages so that the lubricating oil can drip naturally from the drip cup to the contact areas where lubrication is needed. The drawback of this lubricating system is that part of the contact areas, wherein the pivots and the members are in tight contact and/ or the contact areas are far away from the outlet of the oil passage, have no lubricating oil presented for lubrication due to the absence of a pressure which can force the lubricating oil to flow to these contact areas.

Another kind of a lubricating system includes a motor pump which can pump the lubricating oil to the contact areas through the oil passages, and an electric control box which is connected electrically to the motor pump so as to control the motor pump to force a predetermined amount of oil to those contact areas at a predetermined time interval (e.g. 100 c.c. of lubricating oil every 30 minutes). The drawback of this lubricating system is that it is very expensive. Furthermore, the pressure which is generated by the motor pump is insufficient to force a high-viscosity lubricating oil because of insufficient power. A large expense is necessary in order to acquire an adequate and powerful motor pump. Thus, the aforementioned problems in the preceding lubricating system cannot be overcome by this lubricating system due to the relatively low viscosity of the lubricating oil which was used and to the insufficient power of the motor pump. Because of the low viscosity of the lubricating oil, the lubricating oil cannot flow into the tight contact areas even if the oil feeding time interval is minimized and/or the amount of lubricating oil in one pumping action is increased. Furthermore, the excessive lubricating oil is wasted and can cause contamination problems.

SUMMARY OF THE INVENTION

Therefore, the main object of this invention is to provide a lubricating system for an injection molding machine, which lubricating system is efficient and relatively inexpensive.

According to this invention, a lubricating system is provided on a common injection molding machine, which machine includes a stationary mold half unit, a movable mold half unit which can be moved towards and away from the stationary mold half unit, a toggle mechanism coupled with the movable mold half unit so as to be driven to move the movable mold half unit towards and away from the stationary mold half unit, a mold pressing hydraulic cylinder having a piston rod coupled with the toggle mechanism so as to drive the toggle mechanism, and an oil feed system coupled with the mold pressing hydraulic cylinder so as to provide hydraulic pressure for the mold pressing hydraulic cylinder to drive the toggle mechanism. The lubricating system includes a pump driving hydraulic cylinder that is coupled with the oil feed system in such a manner that the pump driving hydraulic cylinder can be activated synchronously with the mold pressing hydraulic cylinder. The pump driving hydraulic cylinder has a cylinder body and a piston rod extending outward from the cylinder body. The piston rod has an outer end which can be moved toward and away from the cylinder body. An oil tank is provided to store lubricating oil therein. A lubricating oil pump has an oil inlet unit coupled with the oil tank and an oil outlet unit coupled with the toggle mechanism. The oil pump is coupled with the piston rod of the pump driving hydraulic cylinder. When the outer end of the piston rod of the pump driving hydraulic cylinder is moved toward the cylinder body of the pump driving hydraulic cylinder, the oil pump is activated to receive lubricating oil from the inlet unit. When the outer end of the piston rod of the pump driving hydraulic cylinder is moved away from the cylinder body of the pump driving hydraulic cylinder, the oil pump is activated to force lubricating oil from the oil pump to the toggle mechanism through the outlet unit so as to lubricate the toggle mechanism.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
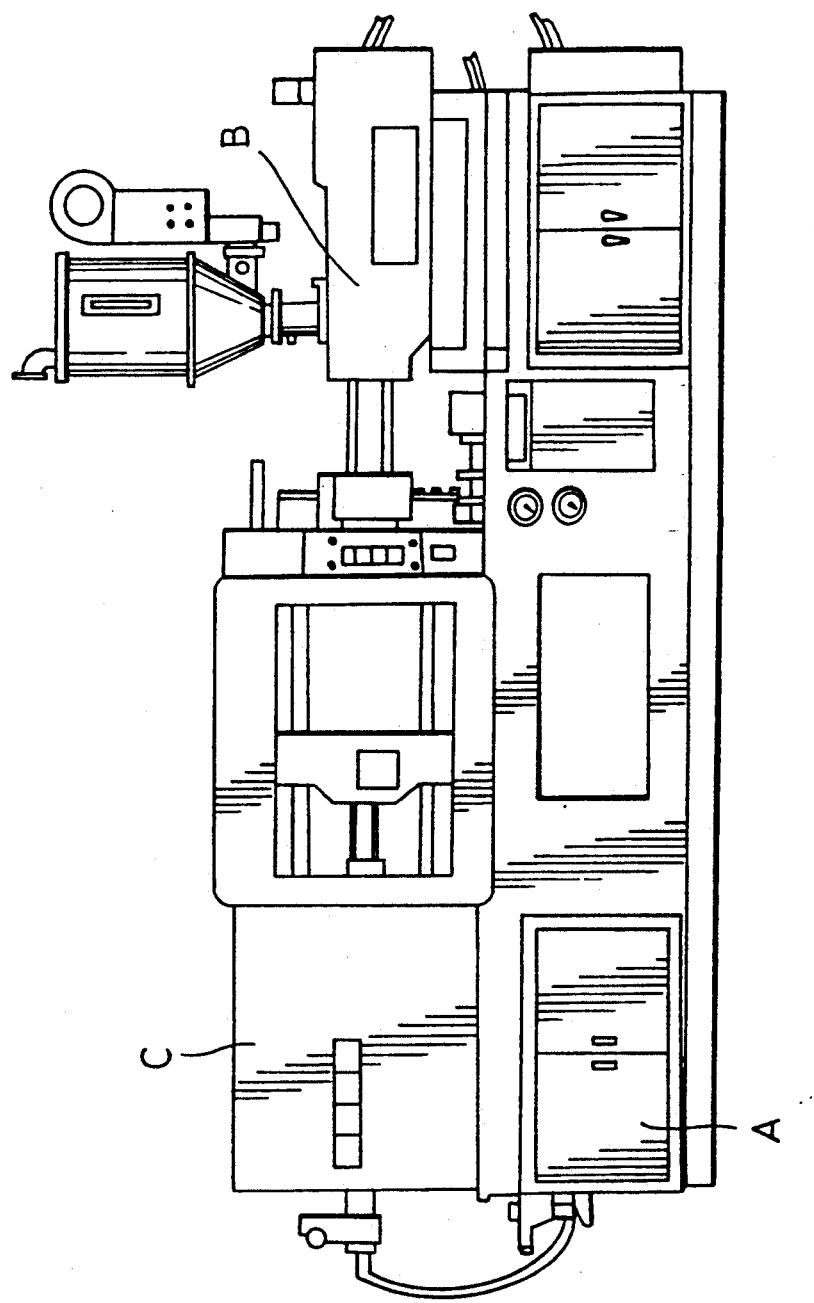
FIG. 1 is a perspective view showing a common injection molding machine.
Figure 2:
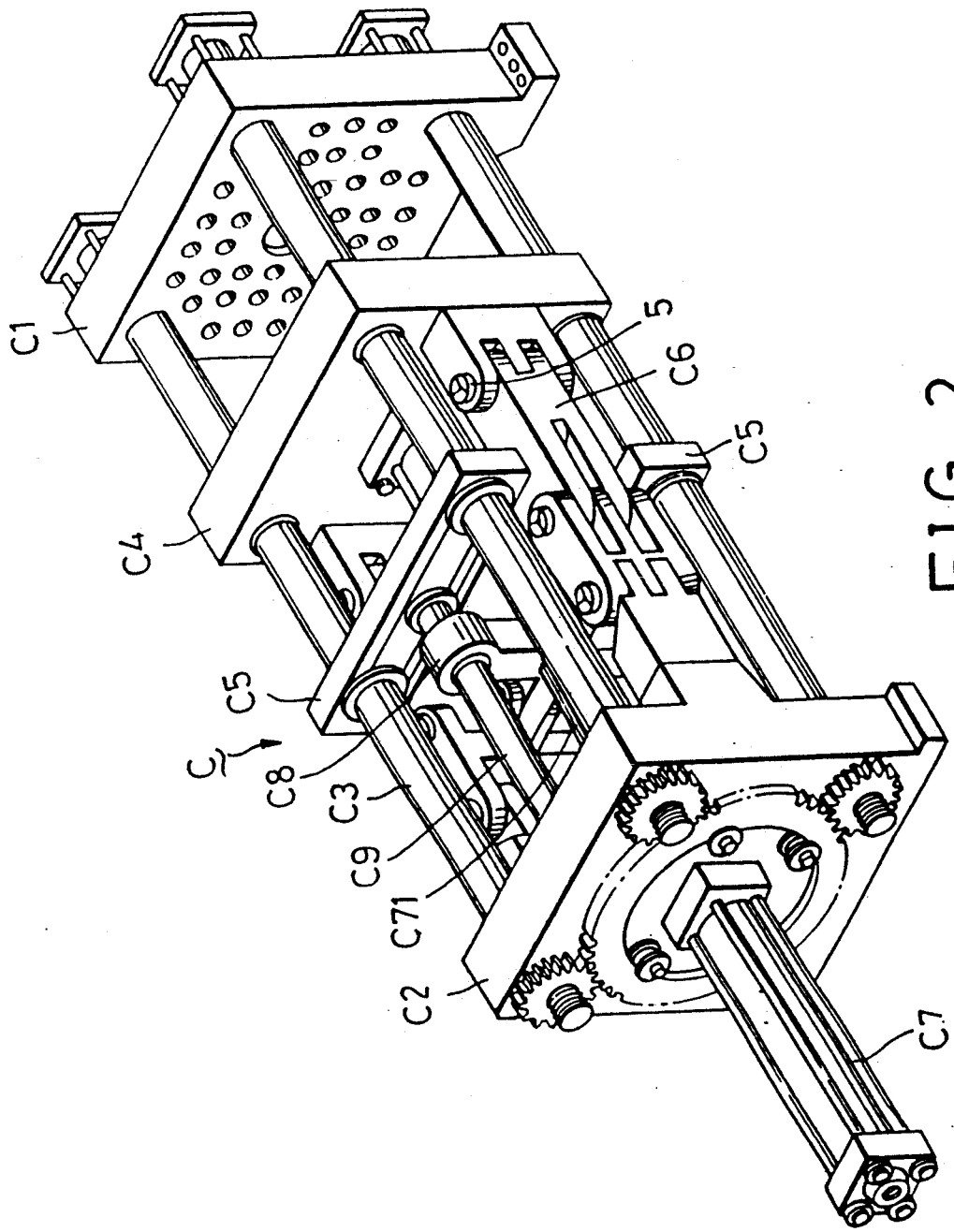
FIG. 2 is a perspective view of the mold pressing system of the common injection molding machine.
Figure 3:
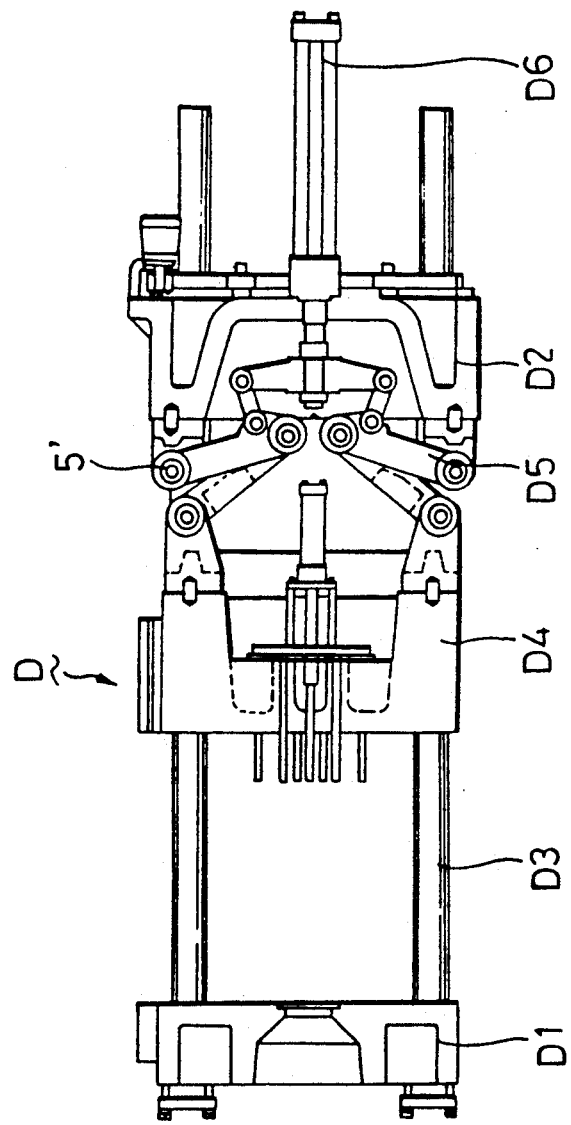
FIG. 3 is a perspective view showing the mold pressing system of another common injection molding machine; and, FIG. 4 is a schematic diagram of the lubricating system for an injection molding machine according to this invention.
Figure 4:
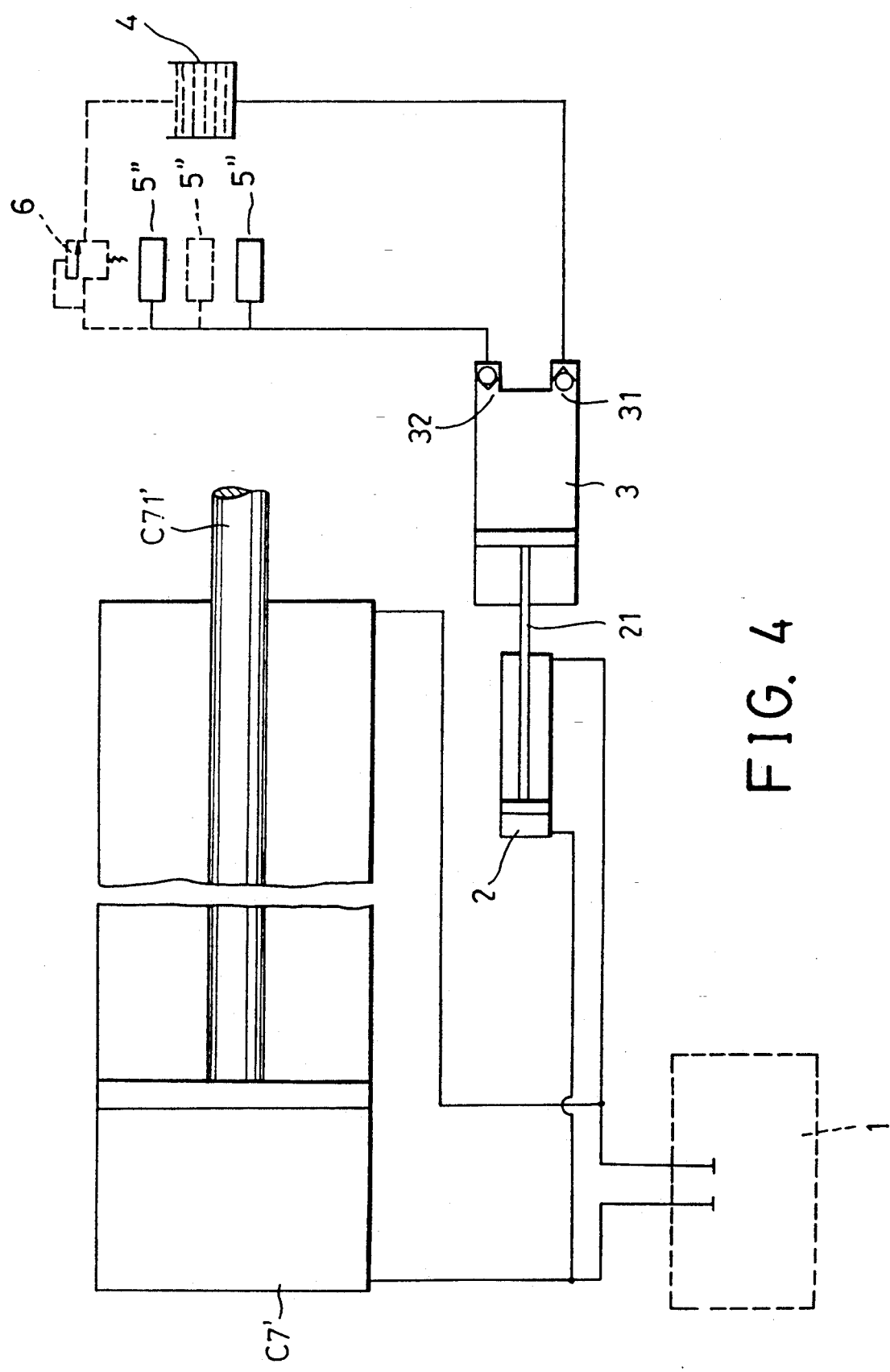

Referring to FIG. 4, a lubricating system for a common injection molding machine according to this invention includes a pump driving hydraulic cylinder (2), a lubricating oil pump (3), an oil tank (4) for storing lubricating oil therein, and a pressure relief valve (6). The molding machine includes an oil feed system (1) and a mold pressing hydraulic cylinder (C7') which is arranged in the injection molding machine in the same manner as the cylinder (C7) (see FIG. 2) and which is coupled with the oil system (1).

The pump driving hydraulic cylinder (2) is coupled with the oil feed system (1) and the mold pressing hydraulic cylinder (C7') so that the oil feed system (1) provides a hydraulic pressure for the mold pressing hydraulic cylinder (C7') and the pump driving hydraulic cylinder (2) at the same time, thereby activating both of the hydraulic cylinders (C7',2). The pump driving hydraulic cylinder (2) has a piston rod (21) which extends outward from the stationary cylinder body thereof. The outer end of the piston rod (21) can be moved hydraulically toward and away from the cylinder body. The lubricating oil pump (3) is coupled with the outer end of the piston rod (21) of the pump driving hydraulic cylinder (2) so that the oil pump (3) is driven by the piston rod (21) of the pump driving hydraulic cylinder (2). The oil pump (3) has an oil inlet unit (31), which is communicated with the oil tank (4) so as to receive lubricating oil from the oil tank (4), and an oil outlet unit (32) which is communicated with the oil tank (4) via an oil conduit unit. The lubricating oil in the conduit unit is accessible to pivots (5") of the toggle mechanism of the injection molding machine.

The pressure relief valve (6) is coupled with the oil outlet unit (32) of the oil pump (3) and with the oil tank (4) so as to relieve excess pressure of the oil pump (3) and so as to permit recollection of excessive lubricating oil from the toggle mechanism into the oil tank (4).

Accordingly, when the piston rod (C71') of the mold pressing hydraulic cylinder (C7') is activated hydraulically by the oil feed system (1), the outer end of the piston rod (21) of the pump driving hydraulic cylinder (2) is activated synchronously by the oil feed system (1) to move toward the cylinder body of the pump driving hydraulic cylinder (2) so as to drive the oil pump (3) to receive oil from the oil tank (4) through the oil inlet (31). When the outer end of the piston rod (21) of the pump driving hydraulic cylinder (2) is moved away from the cylinder body, the pump (3) is driven to force the lubricating oil to flow to the pivots (5") through the oil outlet unit (32). Thus, the pivots (5") are lubricated in every operation of the toggle mechanism of the molding machine, and the pump (3) has a sufficient power to force a high-viscosity lubricating oil to the tight contact areas between the pivots (5") and the members of the toggle mechanism of the mold machine. If the oil pump (3) is overpressurized by the pump driving hydraulic cylinder (2) and forces excessive lubricating oil to the contact areas, the pressure relief valve (6) can relieve the overpressure of the oil pump (3) and can permit the recollection of the excessive lubricating oil from the toggle mechanism into the oil tank (4).

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An injection molding machine, said injection molding machine including a stationary mold half unit, a movable mold half unit which can be moved towards and away from said stationary mold half unit, a toggle mechanism coupled with said movable mold half unit so as to be driven to move said movable mold half unit towards and away from said stationary mold half unit, a mold pressing hydraulic cylinder having a piston rod coupled with said toggle mechanism so as to drive said toggle mechanism, an oil feed system coupled with said mold pressing hydraulic cylinder so as to provide hydraulic pressure for said mold pressing hydraulic cylinder to drive said toggle mechanism, and a lubricating system said lubricating system comprising:

a pump driving hydraulic cylinder coupled with said oil feed system in such a manner that said pump driving hydraulic cylinder can be activated synchronously with said mold pressing hydraulic cylinder, said pump driving hydraulic cylinder having a cylinder body and a piston rod extending outward from said cylinder body, said piston rod having an outer end which can be moved hydraulically toward and away from said cylinder body;

an oil tank for storing lubricating oil; and a lubricating oil pump having an oil inlet unit coupled with said oil tank and an oil outlet unit coupled with said toggle mechanism, said oil pump being coupled with said piston rod of said pump driving hydraulic cylinder; whereby, when said outer end of said piston rod of said pump driving hydraulic cylinder is moved toward said cylinder body of said pump driving hydraulic cylinder, said oil pump is activated to receive lubricating oil through said inlet unit; when said outer end of said piston rod of said pump driving hydraulic cylinder is moved away from said cylinder body of said pump driving hydraulic cylinder, said oil pump is activated to force lubricating oil from said oil pump to said toggle mechanism through said outlet unit so as to lubricate said toggle mechanism.

2. The injection molding machine as claimed in claim 1, further comprising a pressure relief valve coupled with said outlet of said oil pump and said oil tank so as to relieve overpressure of said oil pump and so as to permit recollection of excessive lubricating oil from said toggle mechanism into said oil tank.

* * * * *